(12) United States Patent
Meacham

(10) Patent No.: US 6,502,533 B1
(45) Date of Patent: Jan. 7, 2003

(54) INTERNAL COMBUSTION FUEL REFORMING

(76) Inventor: George Beuan Kirby Meacham, 18560 Parkland Dr., Shaker Heights, OH (US) 44122

(*) Notice: Subject to any disclaimer, the term of this patent is extended or adjusted under 35 U.S.C. 154(b) by 0 days.

(21) Appl. No.: 09/967,649

(22) Filed: Sep. 29, 2001

(51) Int. Cl.$^7$ .............................................. F02B 43/08
(52) U.S. Cl. ................................ 123/3; 123/2; 429/17; 429/19; 429/38; 429/39
(58) Field of Search ............................. 123/2, 3; 429/17, 429/19, 38, 39

(56) References Cited

U.S. PATENT DOCUMENTS

| | | | | |
|---|---|---|---|---|
| 4,031,865 A | * | 6/1977 | Dufour | 123/1 A |
| 4,761,209 A | * | 8/1988 | Bonaventura et al. | 123/2 |
| 5,771,476 A | * | 6/1998 | Mufford et al. | 180/65.1 |
| 6,155,212 A | * | 12/2000 | McAlister | 123/25 B |
| 6,311,650 B1 | * | 11/2001 | Lamm | 123/1 A |

* cited by examiner

Primary Examiner—Tony M. Argenbright
Assistant Examiner—Katrina B. Harris

(57) ABSTRACT

The present invention uses an internal combustion engine operated at an air/fuel ratio richer than stoichiometric as a partial oxidation reformer in fuel cell power generation systems. Commonly available liquid or gaseous hydrocarbon or alcohol fuels, including "logistic" fuel in military applications, are converted to a product gas mixture containing hydrogen, carbon monoxide, and traces of light hydrocarbons. The product gas may be used directly or with minimum processing by high temperature fuel cells, or processed further for use in low temperature fuel cells. Advantages include high efficiency, adaptability to a variety of fuels, and quick system startup with immediate shaft power availability.

21 Claims, 6 Drawing Sheets

FIG. 9. Upper (range of deficiency of air) and lower (range of excess of air) ignition limits of air-gas mixtures, depending on mixture ratio

INTERNAL COMBUSTION FUEL REFORMING

CROSS-REFERENCE TO RELATED APPLICATIONS

Not Applicable

STATEMENT REGARDING FEDERALLY SPONSORED RESERCH OR DEVELOPMENT

Not Applicable

REFERENCE TO A MICROFICHE APPENDIX

Not Applicable

BACKGROUND OF THE INVENTION

The proposed concept is related to conversion of liquid and gaseous hydrocarbon and alcohol fuels to product gas containing hydrogen, carbon monoxide, and traces of hydrocarbons that is useable in fuel cells. In particular, it relates to the unique capability of internal combustion engines (ICEs) operated with fuel in excess of the stoichiometric quantity to carry out this fuel conversion process.

The background of the invention includes processes and systems for supplying fuel to fuel cells, the use of internal combustion engines as chemical reactors, and power plants combining these elements.

Fuel cells are electrochemical systems that generate electrical current by chemically reacting a fuel gas and an oxidant gas on the surface of electrodes. Conventionally, the oxidant gas is oxygen or air, and the fuel gas is hydrogen or a mixture of hydrogen, carbon monoxide, and traces of hydrocarbons. The fuel gas may also contain non-fuel gases including nitrogen, water vapor and carbon dioxide. The specific fuel gas composition requirements depend on the type of fuel cell. Low temperature fuel cells, exemplified by proton exchange membrane (PEM) cells and alkaline fuel cells (AFC), can only utilize hydrogen as fuel, and contain precious metal catalysts that are poisoned by carbon monoxide. High temperature fuel cells, exemplified by solid oxide fuel cells (SOFC) and molten carbonate fuel cells (MCFC), do not contain precious metal catalysts, and utilize hydrogen, carbon monoxide, and traces of hydrocarbons as fuel. Most fuel cell types are adversely affected by sulfur compounds.

Pure hydrogen is the ideal fuel for all fuel cell types, but it is not widely available. Further, storage and transportation involves large, heavy and costly means such as compressed gas bottles. Practical fuel cell generators must therefore utilize commonly available and easily transported fuels including natural gas, liquefied petroleum gas (LPG), methanol, ethanol, gasoline and diesel fuel, and logistic fuel. These hydrocarbons and alcohols must be reformed to fuel gas suitable for the particular fuel cell application. In addition, these fuels often contain sulfur that must be removed. Conventional processes for desulfurizing and reforming liquid and gaseous fuels are well known in the art, and will only be summarized.

Fuel reforming is based on the endothermic reaction of hydrocarbon or alcohol fuel with steam and/or $CO_2$, to form CO and $H_2$. This can be done in two ways. The first is steam reforming. Steam reformers use high temperature catalyst filled tubes heated by burners fueled by fuel cell exhaust fuel and air streams. Steam is supplied by a waste heat boiler. Heat transferred across the tube wall drives the endothermic reaction. Such systems provide the highest hydrogen yield, but tend to be large, complex, and slow to start up and respond to load changes. Further, they require sulfur removal from the feedstock to avoid catalyst poisoning. The second is partial oxidation (POX) reforming. POX reformers and catalytic autothermal reformers eliminate high temperature heat exchangers by reacting a rich mixture of fuel and air to provide the reforming heat within the gas stream. Steam is added to the hot hydrogen and carbon monoxide to cool the stream and increase hydrogen yield. Non-catalytic POX reformers operate at temperatures around 1000° C. for gasoline and up to 1400° C. for heavy hydrocarbons, necessitating special heat-resistant materials. Autothermal reformers use a catalyst to operate at temperatures under 1000° C., and may be less costly. These systems are smaller, simpler and faster responding than steam reformers, and are preferred for applications such as vehicle propulsion. Even so, there is a delay before power is available in a cold start and the feedstock must be low in sulfur.

Generally heavier liquid hydrocarbons such as diesel fuel are the most difficult to reform, and have the greatest tendency to form soot rather than the desired product gas. Further, they are more likely to contain large amounts of sulfur. "Logistic" fuel is an extreme case. It is a low-grade, high sulfur diesel fuel that may be the only fuel available to the military in the field. While reciprocating and turbine ICEs operate directly on logistic fuel, fuel cell power plants require extensive fuel processing capability, resulting in additional size and weight.

The method of sulfur removal depends on both the reforming system and the type of fuel. If the reforming reaction uses a catalyst, then the sulfur is typically removed from the feedstock prior to reforming. Hydrodesulfurization is the classic means used for liquid hydrocarbons. Hydrogen separated from the product gas stream is reacted with the fuel over the catalyst to convert the sulfur compounds to hydrogen sulfide. The hydrogen sulfide is then removed by passing the stream through a zinc oxide bed. Activated charcoal filtration is sufficient to remove sulfur from natural gas before reforming. Non-catalytic POX reformers tolerate sulfur in the fuel, and convert it to hydrogen sulfide that can be removed from the product gas with a zinc oxide bed.

Since low temperature fuel cells can only utilize hydrogen and do not tolerate over 50 ppm CO, shift conversion and selective oxidation stages must be added to increase hydrogen and decrease CO levels. The situation is simpler for high temperature fuel cells. At 600° C. to 1000° C., CO and moderate quantities of hydrocarbons are reformed at the nickel anode surface using the steam, $CO_2$ and heat from the power generation reaction. The reforming process only needs to break down the heavy hydrocarbons into a mix of gasses that the SOFC can utilize directly or reform internally without soot formation. High-temperature fuel cell systems can therefore use the product gas from steam, autothermal and POX reformers directly.

Startup characteristics are often important in fuel cell power plants operating on hydrocarbon and alcohol. A certain amount of time is needed to start a reformer to generate hydrogen, and high temperature fuel cells require time to heat to operating temperature regardless of the availability of fuel. This delay necessitates an interim power source such as a battery or ICE for applications that require immediate response, such as vehicle propulsion or emergency power.

ICEs include turbine, reciprocating piston or other machines that compress air, heat the air by reacting fuel with the oxygen in the air, and expand the heated air to produce work. The theoretical amount of fuel required to consume the oxygen in the air is termed the stoichiometric quantity. Typically, the amount of fuel added is less than the stoichiometric quantity (a lean mixture), since this makes the most efficient and economical use of the fuel. Fuel in excess of the available oxygen (a rich mixture) is discharged in the exhaust and produces no useful work. The composition of excess hydrocarbon fuel, however, is changed by the combustion process. Rich mixture exhaust contains hydrogen, carbon monoxide, and small amounts of hydrocarbons in addition to nitrogen and water vapor. Oxides of nitrogen (NOX), typical pollutants produced by lean mixtures, are suppressed by the reducing environment created by the rich mixture. In addition, sulfur compounds are converted to hydrogen sulfide. The overall result of rich ICE operation with hydrocarbon fuel is shaft work and almost complete conversion of the excess fuel into product gas containing hydrogen and CO. One of the specific problems with a rich running ICE is the production of soot. The theoretical rich soot formation limit for fuel with a stoichiometric ratio of 14.65 is 5.5, but in a real piston ICE soot formation occurs at higher ratios.

Use of an air/fuel mixture richer than stoichiometric in an ICE is a known technique to produce combustible gas. U.S. Pat. No. 4,041,910 by Houseman, assigned to NASA, describes a multicylinder engine in which the exhaust from two rich-running cylinders is used to fuel six lean-running cylinders. This avoids the oxide of nitrogen formation peak near stoichiometric operation, while providing complete fuel combustion. Houseman states that soot-free operation as low as 6.5 can achieved by adding water or steam, recycling the water-containing exhaust from the lean-running cylinders, or vaporizing and thoroughly mixing the fuel with heated air. U.S. Pat. No. 5,339,634 by Gale et. al., assigned to Southwest Research Institute, shows a similar system. In Gale et. al. a shift conversion catalyst is used to increase the hydrogen content of the rich-running cylinder exhaust. This exhaust is then mixed with additional fuel and air and fed to the lean-running cylinders where the hydrogen extends the lean limit. Neither of these patents contemplates using the rich exhaust as fuel for fuel cells.

U.S. Pat. No. 6,276,473 B1 by Zur Megede shows fuel cells and ICEs combined in an integrated vehicle power plant. It does not, however, utilize the ICE as a fuel processor for the fuel cell. Instead, it uses it as a means of providing immediate vehicle motion, as a heat source to warm the fuel cell to operating temperature, and as a supplemental power source after warm-up. The ICE and fuel cell both use a common hydrogen fuel source.

BRIEF SUMMARY OF THE INVENTION

The present invention is a means for generating power from hydrocarbon and alcohol fuels in a power plant that integrates an ICE and a fuel cell. The ICE is operated with a rich hydrocarbon or alcohol fuel mixture to produce shaft power and an exhaust stream containing a mixture of gasses including hydrogen, carbon monoxide, and traces of hydrocarbons. The fuel cell then electrochemically oxidizes this product gas at the anode to produce electric power, while reducing oxygen at the cathode. The depleted fuel cell product gas and air exhaust streams may be handled in several ways. The prior art approach is to mix and combust the streams in an afterburner to produce process heat and eliminate exhaust pollutants. This invention includes additional productive uses for the depleted product gas stream. In one, a portion of the depleted product gas stream is recycled and combined with the ICE inlet fuel-air mixture to supply water vapor for soot suppression. In another, the depleted product gas stream is mixed with air to form a lean mixture that is burned in a separate ICE to produce shaft power and serve as an afterburner. The separate ICE may also be a section of the same machine used to process fuel. An example is to use one or more dedicated cylinders in a multi-cylinder reciprocating ICE that also includes fuel processing cylinders as an afterburner.

The present invention has a number of objectives. First, it employs the high peak temperatures in the ICE cycle to decompose the hydrocarbons and alcohols and hydrogenate sulfur compounds without catalysts. In particular, difficult feedstock such as "logistic" fuel may be processed. At the same time, oxide of nitrogen formation is strongly suppressed through the reducing effect of excess fuel. Reciprocating ICEs are particularly effective in achieving high peak combustion temperatures (on the order of 2000° C.) while maintaining the engine components at relatively low temperatures compatible with ordinary materials. Second, thermodynamic advantages are gained. The gas expansion work produces shaft power and reduces the gas temperature so that the exhaust temperature is on the order of 700° C. Like electric power, shaft power is thermodynamically the highest grade of energy, and contributes to the overall system efficiency. Third, system operation is enhanced. ICEs start in seconds and, while the system warms up, produces immediate shaft power that may be used for a number of purposes including vehicle propulsion and emergency electric power generation. The hot exhaust serves to heat the balance of the fuel processing system and start the electrochemical power generation process. The ICE may be controlled such that startup operation is near stoichiometric to maximize shaft power output and minimize fuel waste and exhaust pollution while the system is heated, and then shifted to rich operation. In general, the ICE facilitates system control. Rotational speed, throttle position and fuel-air ratio may be varied over a wide range to control the composition and flow rate of product gas. Fourth, the invention utilizes mature, low cost ICE technology that is supported by a ubiquitous manufacturing, service and fuel supply infrastructure. This facilitates earlier widespread fuel cell application with the attendant environmental and energy conservation benefits.

In summary, rich-running ICEs are more that simple replacements for conventional reformers in fuel cell systems. The integration of ICEs and fuel cells of the present invention is a novel and synergistic combination that forms a power plant with the energy efficiency and environmental advantages of fuel cells together with the fast response and fuel flexibility of ICEs.

Upon examination of the following detailed description the novel features of the present invention will become apparent to those of ordinary skill in the art or can be learned by practice of the present invention. It should be understood that the detailed description of the invention and the specific examples presented, while indicating certain embodiments of the present invention, are provided for illustration purposes only. Various changes and modifications within the spirit and scope of the invention will become apparent to those of ordinary skill in the art upon examination of the following detailed description of the invention and claims that follow.

BRIEF DESCRIPTION OF THE SEVERAL VIEWS OF THE DRAWING

The appended claims set forth those novel features that characterize the invention. However, the invention itself, as well as further objects and advantages thereof, will best be understood by reference to the following detailed description of preferred embodiments taken in conjunction with the accompanying drawings, where like reference characters identify like elements throughout the various figures, in which:

DETAILED DESCRIPTION OF THE INVENTION

The present invention relates to energy conversion systems that combine ICE and fuel cell elements to convert hydrocarbon and alcohol fuels to electric power and shaft power. The present invention is described with respect to a reciprocating four-stroke Otto cycle IEC. However, it will be obvious to those skilled in the art that the following detailed description is similarly applicable to many types of ICEs that may be operated with excess fuel including rotary, Brayton cycle turbine, and two-stroke reciprocating machines.

Figure 1:
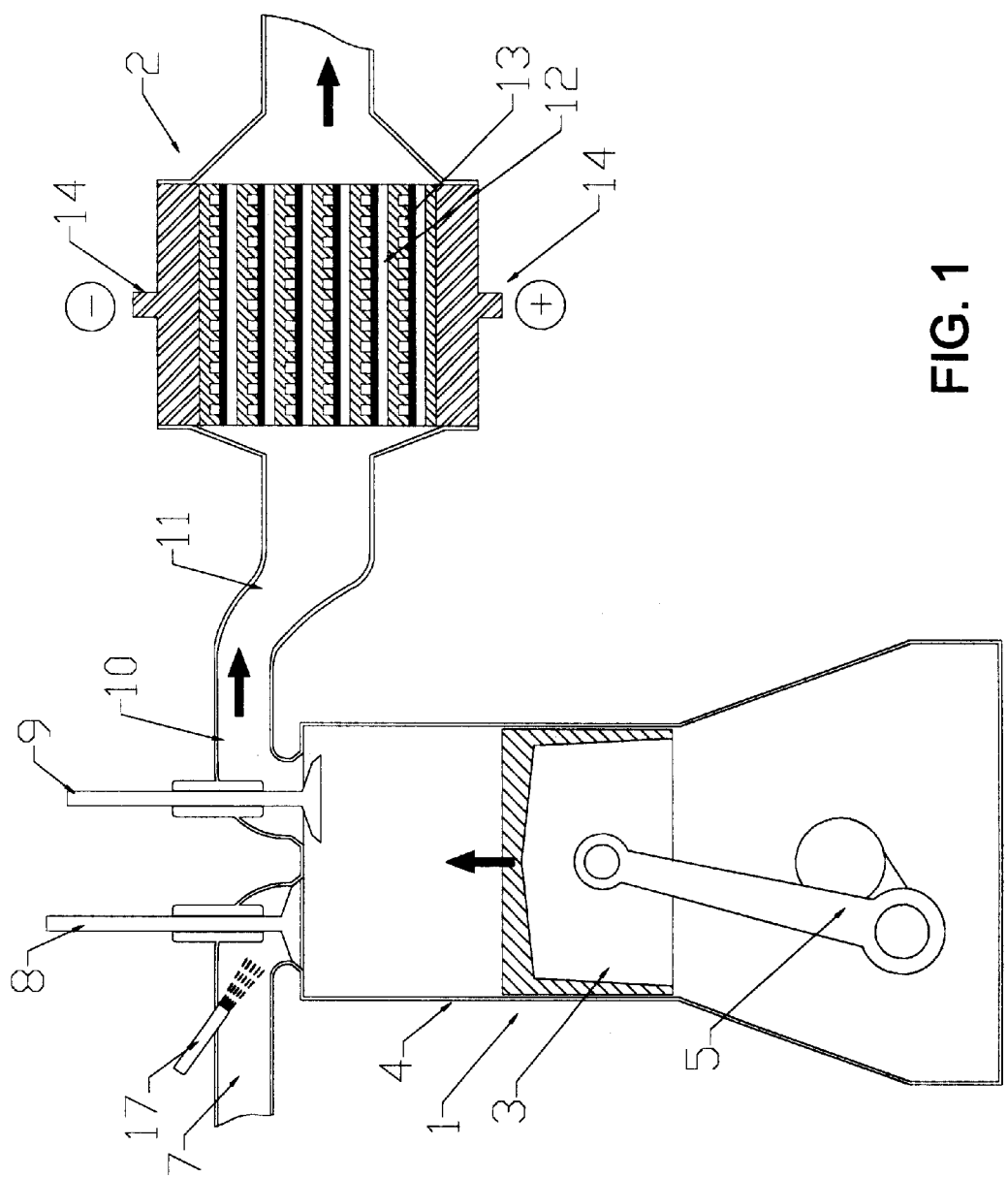
FIG. 1 is an illustration of a reciprocating ICE serving as a fuel processor for high temperature fuel cells.

FIG. 1 illustrates the basic invention. A four-stroke engine 1 is combined with a high temperature fuel cell stack 2. The engine is of generally conventional design, and may be single-cylinder as shown or multi-cylinder. The piston 3 is reciprocated in the cylinder 4 by the connecting rod and crank assembly 5. The fuel injector 17 adds hydrocarbon or alcohol fuel to the incoming air in the inlet passage 7 forming a rich, homogeneous air/fuel mixture. The inlet valve 8 and the exhaust valve 9 are opened and closed in a timed relationship with the motion of the piston 3 such that air/fuel mixture is drawn in through the inlet passage 7, compressed, ignited, expanded to produce shaft power, and pushed out into the exhaust passage 10 as product gas. The combustible constituents of the product gas include hydrogen, carbon monoxide, and small amounts of hydrocarbons. A duct 11 delivers the product gas to the fuel cell anode passages 12, where its combustible constituents are electrochemically oxidized. Air is passed through the cathode passages 13 where its oxygen is electrochemically reduced. The product gas oxidation and oxygen reduction combine to generate electric power that is collected at terminals 14 connected to the cell anodes and cathodes. It should be noted that production of net ICE shaft power is not essential. Operation at idle with no net shaft power output, or operation in which shaft power is supplied to the engine is within the scope of the invention.

Figure 2:
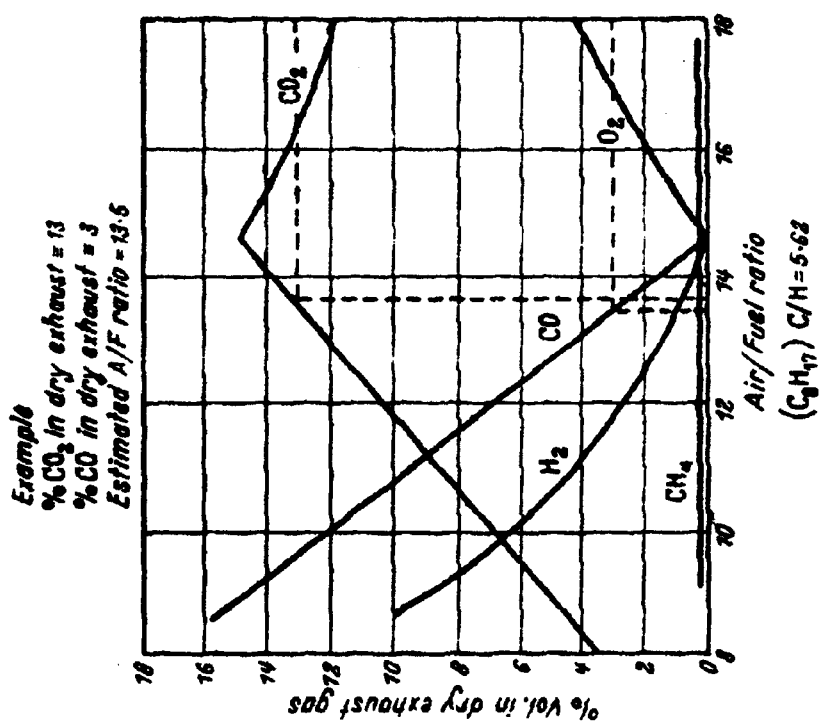
FIG. 2 is a graph reproduced from E. M. Goodger, *Petroleum and Performance in Internal Combustion Engineering*, Butterworth Scientific Publications, London, 1953 that shows the exhaust composition of reciprocating engine exhaust as a function of air/fuel ratio.
Figure 3:
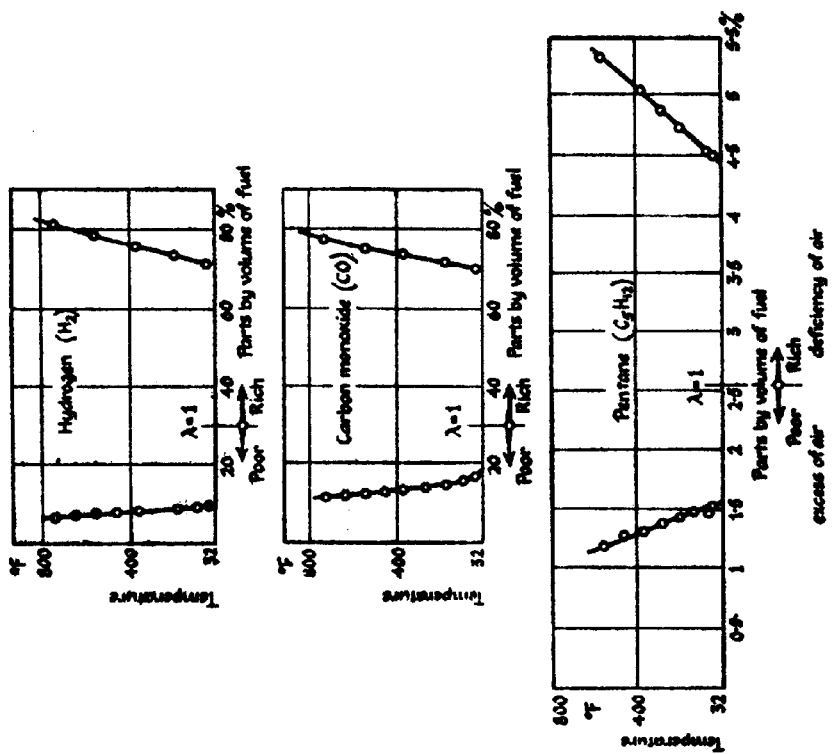
FIG. 3 is a graph reproduced from Fritz A. F. Schmidt, *The Internal Combustion Engine*, Chapman and Hall, London, 1965 that shows the rich and lean combustion limits of pentane, carbon monoxide and hydrogen as a function of mixture temperature.

FIG. 2 shows the dry exhaust gas composition of a four-stroke reciprocating spark ignition ICE operating on liquid hydrocarbon fuel at air/fuel ratios both richer and leaner than stoichiometric. At a rich air/fuel ration of 10:1, for example, the exhaust gas fuel components are about 6.5% hydrogen, 12% carbon monoxide, and a faction of a percent methane. Non-fuel gases include about 7% carbon dioxide and 74% nitrogen. The previous quantities are on a dry basis: wet exhaust gas contains about 15% by volume of water vapor. Oxide of nitrogen content is very low because of the strongly reducing environment in rich, homogeneous combustion. Very rich operation is desirable for several reasons. First, it shifts the energy conversion from the ICE to the fuel cell, which is in many cases more efficient. Second, it increases the fuel concentration in the product gas stream, reducing the flow volume and the size of the flow passages. Finally, it decreases oxide of nitrogen formation. Historically, rich ICE operation has been used with piston engines primarily for cold starting and to generate peak power for motor vehicle acceleration or aircraft takeoff. Normal operation is slightly leaner than stoiciometric for efficiency and low exhaust emissions. The smoke limit, the point at which some excess fuel is converted to soot rather than hydrocarbon monoxide, forms the practical limit to rich operation. In theory, soot formation occurs below an air/fuel ratio of 5.5 for fuel with a stoichiometric ratio of 14.65, but in real ICEs soot formation occurs at higher ratios. According to Houseman, (U.S. Pat. No. 4,041,910) soot-free operation as low as 6.5 can be achieved by a combination of means including addition of water, steam or recycled exhaust to the air/fuel mixture, and vaporizing and thoroughly mixing the fuel with heated air. The data in FIG. 3 supports Houseman's conclusions. The rich combustion limits for several different fuels are two or more times the stoichiometric fuel quantity, and the limits increase with temperature.

A power plant is defined as a system that contains all the elements required to convert fuel and air into electric or mechanical power, and complete power plants using the present invention may require elements in addition to the ICE and fuel cell. Three power plant system variations are shown schematically in FIG. 4–FIG. 6 below. All include sulfur removal, but it should be understood that availability of low-sulfur fuel or use of fuel cells that are sulfur tolerant could eliminate this need. In addition to the major components shown, a number of components including a supervisory control system, sensors, valves, pumps, blowers, thermal insulation, electric power conditioning and control systems, and enclosures may be required to implement the invention and adapt it to particular applications. These are not part of the present invention, and are omitted from the descriptions for clarity.

Figure 4:
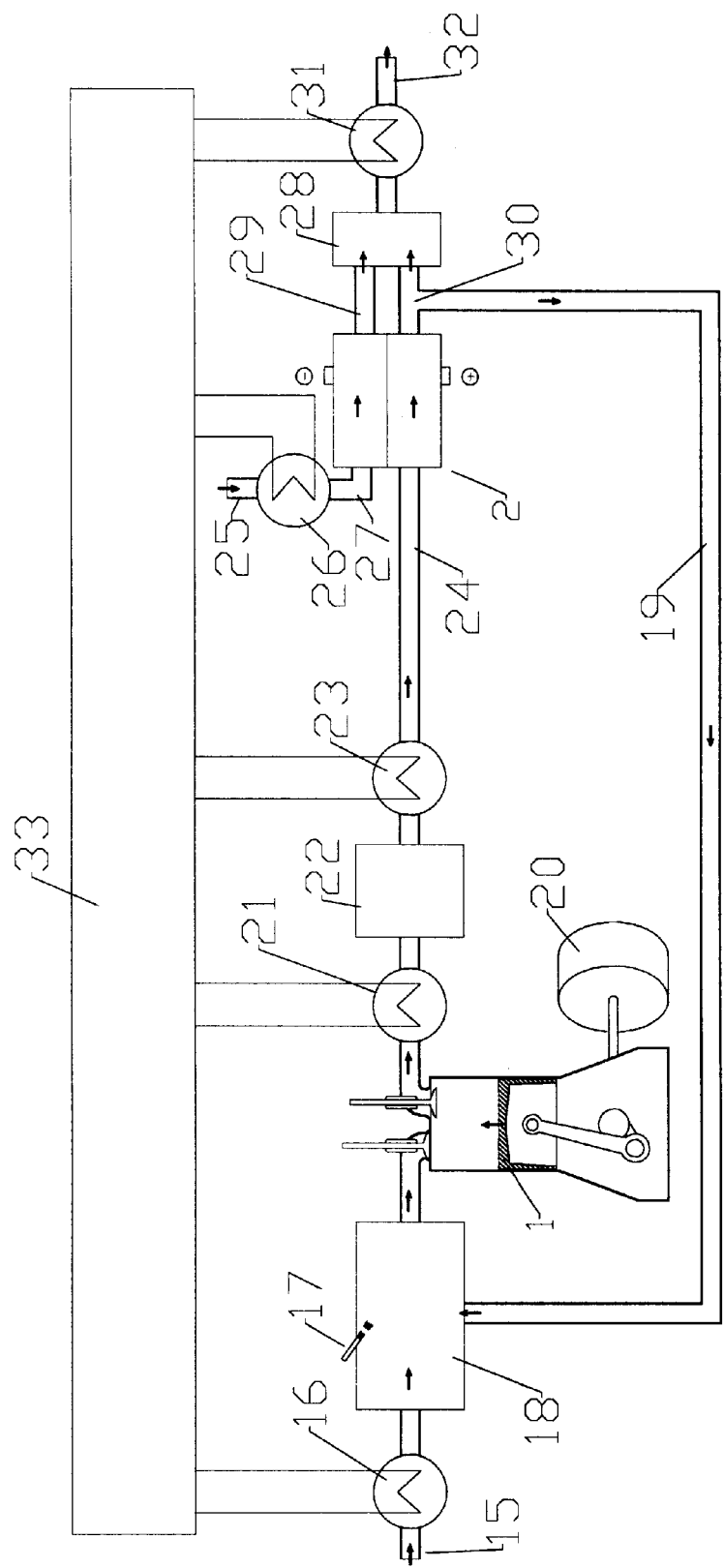
FIG. 4 illustrates a power plant embodying the invention using high-temperature fuel cells and an afterburner to consume depleted product gas.

FIG. 4 shows a power plant system containing high temperature fuel cells. ICE inlet air enters duct 15, and is heated to 250° C. to 350° C. in heat exchanger 16 to assure fuel vaporization. Fuel is added through injector 17 and mixed with the heated air in chamber 18. Optionally, depleted anode product gas from duct 19 is added to the inlet mixture to increase the water vapor content and suppress soot formation. The inlet mixture is then drawn into the ICE 1 and combusted to produce shaft power and product gas. The shaft power is delivered to a load 20 that may be an electric generator, power plant auxiliaries, vehicle propulsion, or other application. The product gas temperature is about 700° C. as it leaves the ICE, and is cooled to 350° in heat exchanger 21 before passing through zinc oxide bed 22 for hydrogen sulfide removal. Cooling is necessary since higher temperatures will damage the zinc oxide. The desulfurized product gas is reheated in heat exchanger 23 to 500° C. to 800° C. before entering the anode passages of the fuel cells 2 through duct 24. Fuel cell inlet air enters duct 25, and is heated to 500° C. to 800° C. in heat exchanger 26 before entering the cathode passages of the fuel cells 2 through duct 27. A portion, typically 60% to 90%, of the fuel value of the product gas is electrochemically oxidized in the anode passages by the air passing through the cathode passages. Typically 30% of 80% of the oxygen is electrochemically reduced and removed from the air stream. The depleted air stream then enters the afterburner 28 through duct 29. The product gas exhaust stream is optionally divided into two portions at junction 30. One portion enters the afterburner 28 where it is mixed with the depleted air stream and combusted. The afterburner exhaust stream, which is largely free of unburned fuel constituents, is cooled in heat exchanger 31 and released to the atmosphere through exhaust duct 32. The other portion of the product gas exhaust stream leaving junction 30 flows through duct 19 and is mixed with the ICE inlet mixture. The thermal management system 33 consists of multiple heat transfer paths that move heat from heat exchangers 21 and 31 that cool gas streams to heat exchangers 16, 23, and 26 that heat gas streams.

Figure 5:
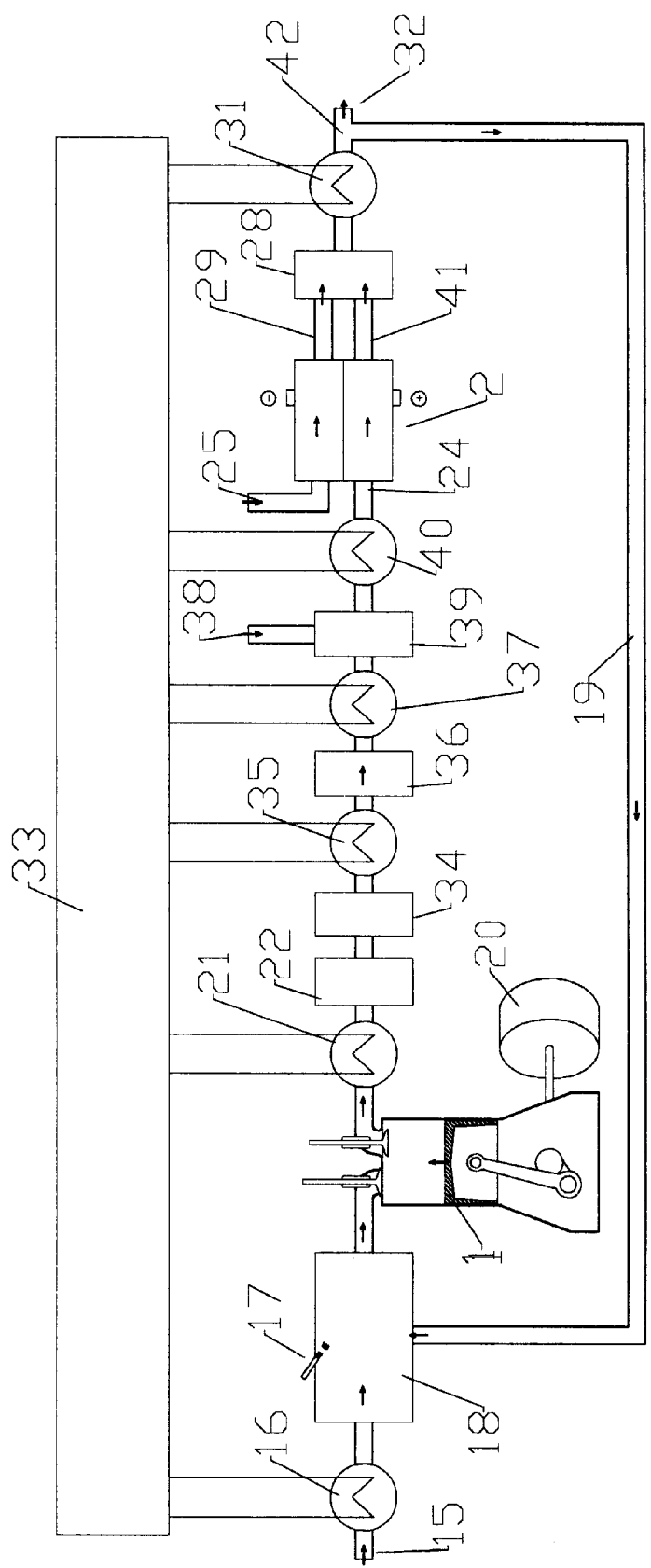
FIG. 5 illustrates a power plant embodying the invention using low-temperature fuel cells and an afterburner to consume depleted product gas.

FIG. 5 shows a power plant system containing low temperature fuel cells. As in the high temperature system, ICE inlet air enters duct 15, and is heated to 250° C. to 350° C. in heat exchanger 16. Fuel is added through injector 17 and mixed in chamber 18 with the heated air. Optionally, afterburner exhaust from duct 19. is added to the inlet mixture to increase the water vapor content and suppress soot formation. The inlet mixture is then drawn into the ICE 1 and combusted to produce product gas, and shaft power is delivered to load 20. The product gas is cooled to 350° in heat exchanger 21 and passed through zinc oxide bed 22 for hydrogen sulfide removal. Additional process steps are required to condition the product gas for the low-temperature fuel cells. The high temperature shift converter 34 uses an iron oxide and chromium oxide catalyst to convert a portion of the carbon monoxide to hydrogen and carbon dioxide through a reaction with water vapor in the gas stream. The reaction is exothermic, and the conversion decreases with increasing temperature. For this reason, shift conversion is done in stages with cooling in-between. Heat exchanger 35 is used to cool the gas stream to 200° C. to 250° C. before it enters the low temperature shift converter 36 where a copper oxide and zinc oxide catalyst converts additional carbon monoxide to hydrogen. Heat exchanger 37 cools the stream to 150° C. to 200° C. It is then mixed with a small amount of air entering through duct 38, and carbon monoxide is selectively oxidized by the platinum catalyst 39. The product gas stream is cooled in heat exchanger 40 to a temperature compatible with the low temperature fuel cells before it enters the anode passages of the fuel cells 2 through duct 24. Fuel cell inlet air enters duct 25 and flows into the cathode passages of the fuel cells 2 through duct 26. A portion, typically 60% to 90%, of the product gas is electrochemically oxidized in the anode passages by the air passing through the cathode passages. Typically 30% of 80% of the oxygen is electrochemically reduced and removed from the air stream. The depleted air and product gas streams enter the afterburner 28 through ducts 29, and 41 where they mix and combust. The afterburner exhaust stream, which contains carbon dioxide and water vapor and is largely free of unburned fuel constituents, is cooled in heat exchanger 31 and released to the atmosphere through exhaust duct 32. A portion of the afterburner exhaust stream is optionally diverted at junction 42 into duct 19 to be mixed with the ICE inlet mixture. The thermal management system 33 consists of multiple heat transfer paths that move heat from heat exchangers 21, 35, 37, 40 and 31 that cool gas streams to heat exchanger 16 that heats the inlet air stream.

Figure 6:
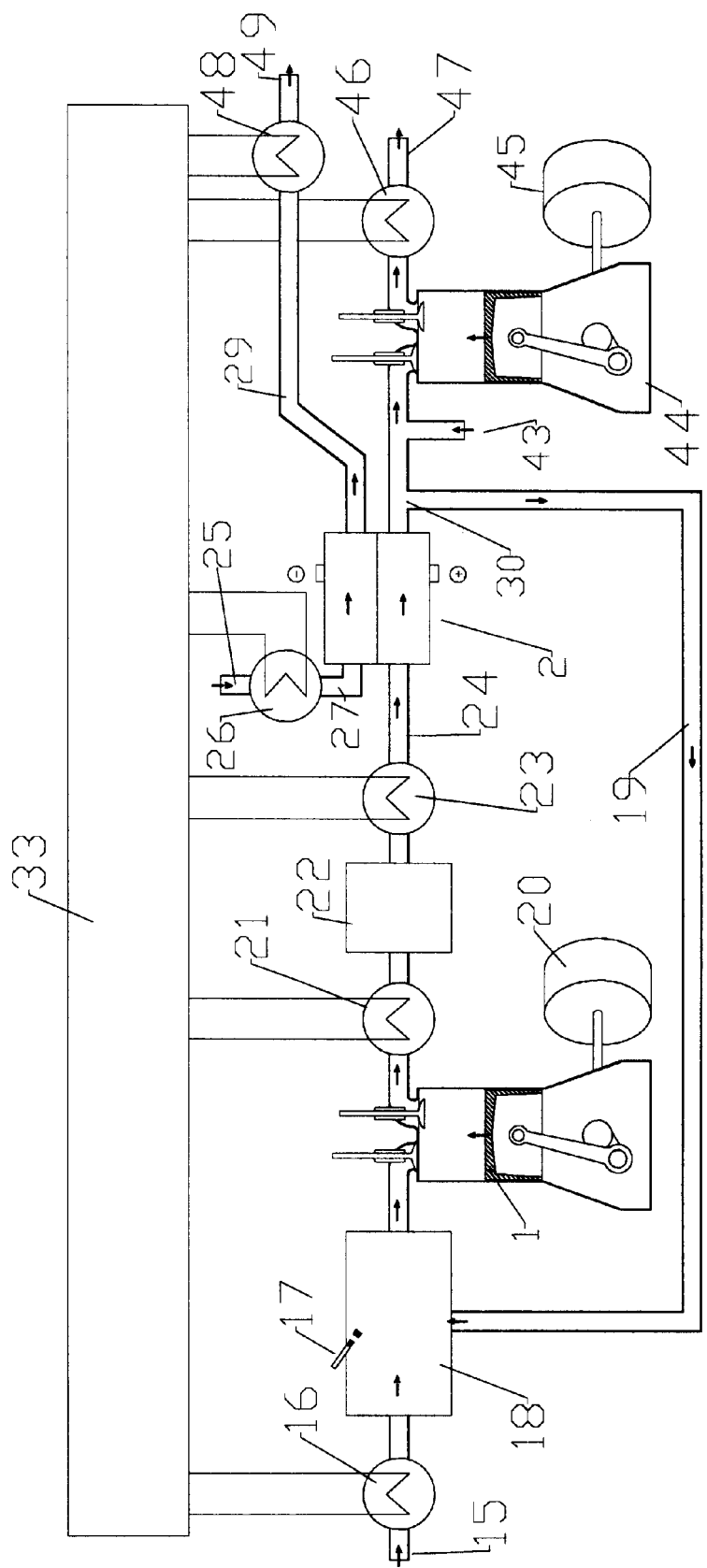
FIG. 6 illustrates a power plant embodying the invention using high-temperature fuel cells and an ICE for utilizing depleted product gas.

FIG. 6 shows a power plant system containing high temperature fuel cells that uses a second ICE engine to combust the depleted product gas and extract additional work. The system flow up to the fuel cell exit in this example is similar to the high temperature fuel cell example of FIG. 4. ICE inlet air enters duct 15, and is heated to 250° C. to 350° C. in heat exchanger 16, fuel is added through injector 17 and mixed in chamber 18 with the heated air. Optionally, system exhaust from duct 19 is added to the inlet mixture to increase the water vapor content and suppress soot formation. The inlet mixture is then drawn into the first ICE 1 and combusted to produce product gas, and shaft power is delivered to a load 20. The product gas is cooled to 350° in heat exchanger 21 and passed through zinc oxide bed 22 for hydrogen sulfide removal. The desulfurized product gas is reheated in heat exchanger 23 to 500° C. to 800° C. before entering the anode passages of the fuel cells 2 through duct 24. Fuel cell inlet air enters duct 25, and is heated to 500° C. to 800° C. in heat exchanger 26 before entering the cathode passages of the fuel cells 2 through duct 27. A portion, typically 60% to 90%, of the product gas fuel value is electro-chemically oxidized in the anode passages by the air passing through the cathode passages. Typically 30% of 80% of the oxygen is electrochemically reduced and removed from the air stream. The depleted product gas stream is optionally divided into two portions at junction 30. Air is added to one portion of the depleted product gas through duct 43 to form a lean air/fuel mixture that enters the second ICE 44. Lean-burning ICE 44 supplies shaft power to load 45 and acts as an afterburner to consume the remaining fuel in the product gas stream. Exhaust from the second ICE is cooled in heat exchanger 46 and released to the atmosphere through exhaust duct 47. The depleted cathode air stream passes through duct 29 and heat exchanger 48 and is released to the atmosphere through exhaust duct 49. The other portion of the product gas exhaust stream leaving junction 30 flows through duct 19 and is mixed with the inlet mixture of ICE 1. The thermal management system 33 consists of multiple heat transfer paths that move heat from heat exchangers 21, 46, and 48 that cool gas streams to heat exchangers 16, 23, and 26 that heat fluid streams. The ICEs 1 and 44 may be separate machines as shown or dedicated fluid paths through a single machine. An example is a multicylinder reciprocating engine in which one group of cylinders comprises ICE 1 and another group comprises ICE 44.

There are no definite upper or lower limits to the output of power plants incorporating the present invention, and output of less than 100 watts to tens of megawatts is contemplated.

The foregoing embodiments of the present invention have been presented for the purposes of illustration and description. These descriptions and embodiments are not intended to be exhaustive or to limit the invention to the precise form disclosed, and obviously many modifications and variations are possible in the light of the above disclosure. The embodiments were chosen and described in order to best explain the principle of the invention and its practical applications to thereby enable others skilled in the art to best utilize the invention in its various embodiment and with various modifications as are suited to the particular use contemplated. It intended that the invention be defined by

What I claim is:

1. An energy conversion system comprising
   A. an ICE operated with a working fluid of air containing system fuel in excess of the stoichiometric quantity, with the result that hydrogen, carbon monoxide, hydrocarbons, reduced sulfur or combinations of the same are present in the ICE product gas exhaust;
   B. one or more fuel cells that produce electric power through electrochemical oxidation of product gas containing hydrogen, carbon monoxide hydrocarbons, reduced sulfur or combinations of the same at the anode surfaces and reduction of air at the cathode surfaces;
   C. gas transfer means to move at least a portion of the product gas from said ICE to the anode surfaces of said fuel cells;
   D. supply means to bring air to the cathode surfaces of said fuel cells;
   E. exhaust means to remove spent product gas and air from said fuel cell anode and cathode.

2. The energy conversion system of claim 1 wherein shaft power produced by the said ICE is utilized to generate electric power or perform mechanical work.

3. The energy conversion system of claim 1 wherein heat transfer devices heat or cool the said ICE working fluid, ICE product gas, air supplied to the fuel cell cathode or spent gasses from fuel cell anode and cathode.

4. The energy conversion system of claim 3 wherein said heat transfer devices are connected such that thermal energy gained from cooling high temperature streams is used to heat low temperature streams.

5. The energy conversion system of claim 1 wherein the said gas transfer means includes processing means to remove chemical species from the product gas stream.

6. The energy conversion system of claim 1 wherein the said gas transfer means includes processing means to change the product gas chemical composition.

7. The energy conversion system of claim 1 wherein the said exhaust means mixes and combusts the spent anode and cathode gases in an afterburner and discharges the products from the system.

8. The energy conversion system of claim 1 wherein the said exhaust means
   A. discharges the spent cathode gases from the system;
   B. mixes air with the spent product gas to form a lean mixture which operates a second ICE;
   C. discharges the second ICE exhaust gases from the system.

9. The energy conversion system of claim 8 wherein shaft power produced by the said second ICE is utilized to generate electric power or perform mechanical work.

10. The energy conversion system of claim 8 wherein the said second ICE is an integral subsection of the first ICE.

11. The energy conversion system of claim 1 wherein the said working fluid is mixed to obtain a substantially homogeneous mixture.

12. The energy conversion system of claim 1 wherein the said working fluid is heated.

13. The energy conversion system of claim 1 wherein water, hydrogen, carbon dioxide, carbon monoxide or hydrocarbons are added to the said working fluid.

14. The energy conversion system of claim 13 wherein the said water, hydrogen, carbon dioxide, carbon monoxide or hydrocarbons are contained in depleted product gas recycled from the fuel cell anode.

15. The energy conversion system of claim 13 wherein the said water and carbon dioxide are contained in gas recycled from the afterburner exhaust.

16. The energy conversion system of claim 13 wherein the said water and carbon dioxide are contained in product gas recycled from the ICE exhaust stream.

17. A method of converting system fuel into product gas more readily used by fuel cells comprising
   A. mixing the system fuel with air to form a rich mixture;
   B. optionally adding water vapor, hydrogen and carbon monoxide to the mixture;
   C. optionally heating the mixture
   D. combusting the mixture in an ICE to carry out a high temperature partial oxidation reaction producing a product gas exhaust stream containing hydrogen, carbon monoxide, hydrocarbons, reduced sulfur or combinations of the same;
   E. utilizing available ICE shaft power to provide useful work;
   F. processing the product gas stream to change its temperature or composition to meet the requirements of the associated fuel cells;
   G. transporting the product gas to the fuel cells.

18. The method of claim 17 wherein the said associated fuel cells utilize the ICE product gas stream directly without processing.

19. The method of claim 17 wherein the said ICE product gas stream is cooled, passed through a sulfur absorption bed and further heated or cooled to match the fuel cell requirements.

20. The method of claim 19 wherein the said ICE product gas stream is additionally passed through one or more stages of carbon monoxide to hydrogen shift conversion with cooling between stages.

21. The method of claim 20 wherein the said ICE product gas stream is additionally passed over a selective oxidation catalyst with added air.

* * * * *